United States Patent [19]

Schlachter

[11] Patent Number: 5,598,962

[45] Date of Patent: Feb. 4, 1997

[54] SECURITY TRUNK FOR SPORT UTILITY VEHICLES

[76] Inventor: Bradley S. Schlachter, 6211 W. Northwest Hwy., Suite 253D, Dallas, Tex. 75225

[21] Appl. No.: 383,241

[22] Filed: Feb. 3, 1995

[51] Int. Cl.$^6$ .................................................. B62D 33/04
[52] U.S. Cl. ........................ 224/542; 224/549; 224/555
[58] Field of Search .................................. 224/311, 314, 224/542, 549, 554, 555, 567

[56] References Cited

U.S. PATENT DOCUMENTS

| | | | |
|---|---|---|---|
| 2,889,097 | 6/1959 | Broehl | 224/542 |
| 3,393,936 | 7/1968 | Hall | 296/24 |
| 4,199,188 | 4/1980 | Albrecht et al. | 296/100 |
| 4,252,362 | 2/1981 | Campbell | 296/98 |
| 4,718,584 | 1/1988 | Schoeny | 224/311 X |
| 4,828,312 | 5/1989 | Kinkel et al. | 296/37.6 |
| 5,169,200 | 12/1992 | Pugh | 296/37.6 |
| 5,180,089 | 1/1993 | Suman et al. | 224/554 X |
| 5,183,307 | 2/1993 | Chiu, Jr. | 296/24.1 |
| 5,320,397 | 6/1994 | Peterson et al. | 296/57.1 |
| 5,441,183 | 8/1995 | Frenzel | 224/542 |

FOREIGN PATENT DOCUMENTS 2395861  1/1979  France  ..................  224/549

*Primary Examiner*—Renee S. Luebke
*Attorney, Agent, or Firm*—Dennis T. Griggs

[57] ABSTRACT

A removable security trunk for a motor vehicle such as a station wagon, van or sport-utility type vehicle having a relatively large rear access opening with a width less than the width between the sidewalls or trim panels of a rear cargo compartment in the vehicle. The security trunk includes opposed longitudinally extending support members which may be secured to the compartment sidewalls for supporting a generally horizontally extending top panel for sliding movement into and out of the vehicle rear access opening at the reduced width portion. One or more vertically extending fore and aft partitions extend between the top panel and the compartment support deck for providing multiple storage compartments and for supporting the top panel. The partitions may be disconnected from the top panel whereby three generally planar members may be easily stored in or out of the vehicle. An alternate embodiment comprises vertical sidewall support members and a floor member secured to a generally horizontal top panel whereby a somewhat box-like enclosure may be inserted in and removed from the vehicle cargo compartment while providing, in its working position, a security closure to prevent viewing or access to articles in the vehicle cargo compartment except through a liftgate, tailgate or rear doors.

10 Claims, 3 Drawing Sheets

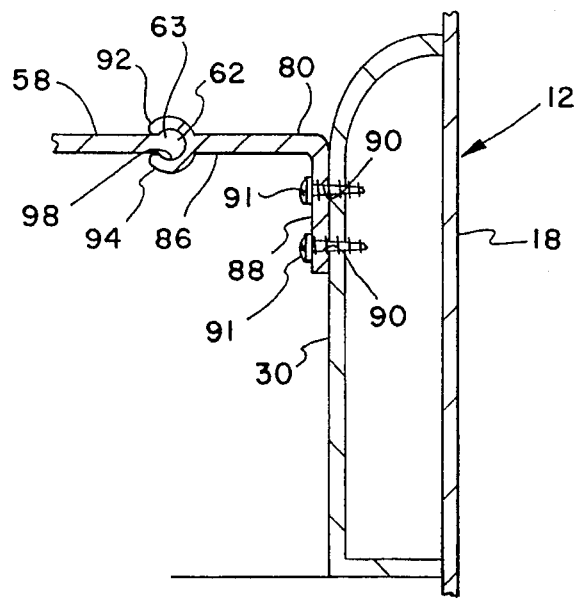
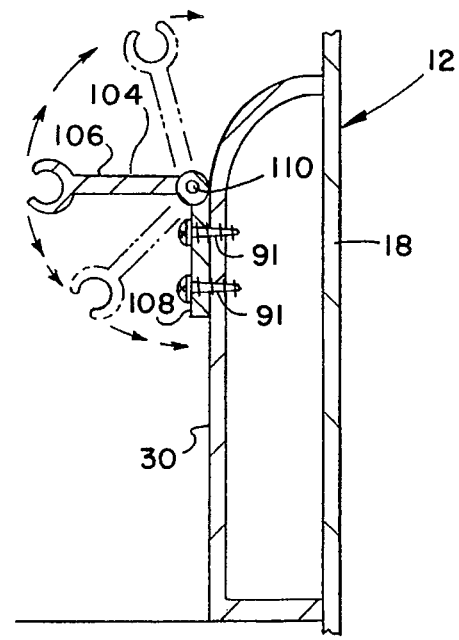
FIG. 3
FIG. 4
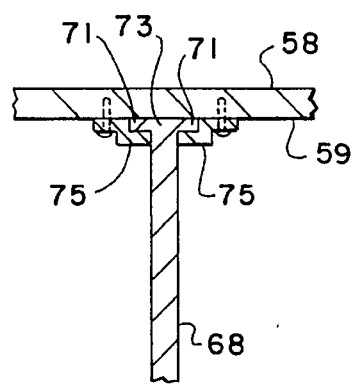
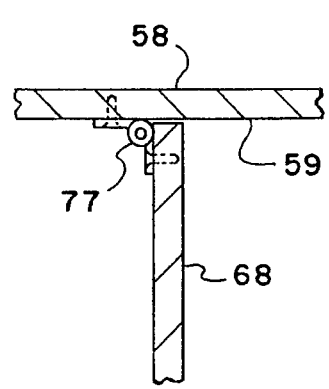
FIG. 5
FIG. 6

SECURITY TRUNK FOR SPORT UTILITY VEHICLES

FIELD OF THE INVENTION

This invention relates to security enclosures for the rear cargo compartment of an automotive vehicle, particularly a station wagon, van or sport-utility vehicle.

BACKGROUND OF THE INVENTION

The cargo compartments of vehicles such as station wagons or vans, and more recently station wagon vehicles also known as "sport-utility" vehicles, provide space for tools, luggage, portable radios and many other valuables which are viewable from the exterior of the vehicles and are a hazard to the security of the vehicles and their contents. In fact, many of these articles are not carried in such vehicles because of the risk of exposure and theft. Moreover, the widespread popularity of the above-mentioned types of vehicles, including their utilitarian aspects, is offset by the exposure of items stored in the somewhat open cargo or luggage carrying compartments of these vehicles. As a result of the risk of theft or unauthorized use, many items which would ordinarily and conveniently be left in the vehicle when it is parked, must be off-loaded and secured or left unguarded when the vehicle is unoccupied.

DESCRIPTION OF THE PRIOR ART

It is known to provide storage enclosures for securing portable properties such as luggage, tools and equipment in open load deck vehicles with tailgates, such as pickup trucks and open utility vehicles. It is also known to cover the rear storage compartments of station wagons by horizontally extending curtains which may be drawn over the compartment load deck to conceal the contents stored in the compartment. Certain collapsible or foldable partitions have also been developed for station wagon storage compartments for disposition between the rear seat and the tailgate.

However, the arrangement of the load support deck, deck sidewalls or panels and rear access opening for many types of station wagons, vans and sport-utility vehicles has prompted the development of a security trunk or enclosure which may be easily fitted in and removed from the cargo compartment of the vehicle through the rear access opening and disposed above the vehicle load support deck a sufficient distance to provide a secure, enclosed area above the deck which may not be viewed from exterior of the vehicle and may not be accessed except by opening the vehicle rear door, liftgate or tailgate. Satisfying these objects has been difficult to achieve in many modern sport-utility and station wagon vehicles wherein the width of the rear access opening is less than the distance between the opposed load deck sidewalls or trim panels.

SUMMARY OF THE INVENTION

The present invention provides a unique, universal security trunk or enclosure for the rear cargo compartment of a vehicle such as a station wagon, van, sport-utility vehicle or the like.

In accordance with an important aspect of the invention, a universal security trunk is provided for a vehicle having a rear access opening, a load deck extending between the access opening and the rear seat of the vehicle, and between the opposed side panels of the compartment. The security trunk is provided by a generally horizontal top panel which may be slidably inserted in the vehicle through the rear access opening and supported by opposed support members which may be secured to the opposed sidewalls or interior trim panels of the storage or cargo compartment. A sliding connection between the top panel member and the support members may be provided by opposed channels or slots which receive the top panel member. The connecting elements may be reversed with the channel slots formed on the panel itself.

In accordance with another important aspect of the invention, a unique universal security trunk is provided for the rear cargo compartment of a station wagon, sport-utility or van type vehicle in which the vehicle rear access opening is of a width less than the distance between the opposed cargo compartment trim panels which extend upward from the load deck and define opposed sides of the cargo compartment.

In accordance with yet a further aspect of the present invention, a security trunk is provided for an automotive vehicle wherein a slidable top panel member is supported between opposed support members secured to interior trim panels of the vehicle. One or more vertical depending partitions at least partially support the top panel member and also form separate compartments for storing selected items in the cargo compartment of the vehicle in a more secure manner. The partitions may be removably secured to the top panel so that the security trunk may be disassembled and carried in the cargo compartment in a collapsed and out-of-the-way condition, if desired. The provision of at least one vertical partition which is secured to the underside of the horizontal top panel transfers the weight of any articles stored in the vehicle on top of the top panel to the load deck and also forms plural storage compartments under the top panel.

Several advantages are provided by the security trunk of the present invention. In particular, a unique arrangement of a security trunk is provided for station wagon and sport-utility type vehicles where the vehicle rear access opening is not as wide as the spacing between the opposed compartment sidewalls or trim panels. The provision of the opposed left and right side panel support members, which are laterally offset with respect to the cargo compartment sidewalls or trim panels, make it possible for the top panel to be slidably removed from the vehicle storage compartment when the tailgate, hatch or liftgate is in an open position. The laterally offset panel support members are easily secured to the opposed compartment sidewalls for supporting the top panel at a position between the sidewalls and at an elevation above the load deck but below the top edges of the sidewalls. Moreover, the vertical partitions provide load-bearing support for articles placed on the horizontal top panel while simultaneously partitioning the vehicle cargo compartment below the top panel.

In accordance with another aspect of the invention, there is provided a self-contained security trunk for the rear storage compartment of a van or mini-van, in particular, and which is self-contained and may be removed from the storage compartment through the vehicle rear access opening. This alternate embodiment of the invention includes a top generally horizontally extending security panel, spaced apart vertical partitions and support panels, a bottom panel and an upwardly projecting transverse partition which prevents loss of articles out of the vehicle rear access opening.

Those skilled in the art will further appreciate the above-mentioned advantages and superior features of the invention together with other important aspects thereof upon reading

BRIEF DESCRIPTION OF THE DRAWING

FIG. 3 is a detail view taken from the line 3—3 of FIG. 2 and showing one of the top panel support members;

FIG. 4 is a detail view similar to FIG. 3 showing an alternate embodiment of one of the top panel support members;

FIG. 5 is a detail view taken generally in a plane parallel to the plane of FIG. 3 showing a connection between the security trunk top panel and one of the vertical partitions;

FIG. 6 is a detail view showing an alternate embodiment of a connection between the top panel and one of the vertical partitions;

DESCRIPTION OF PREFERRED EMBODIMENTS

Figure 1:
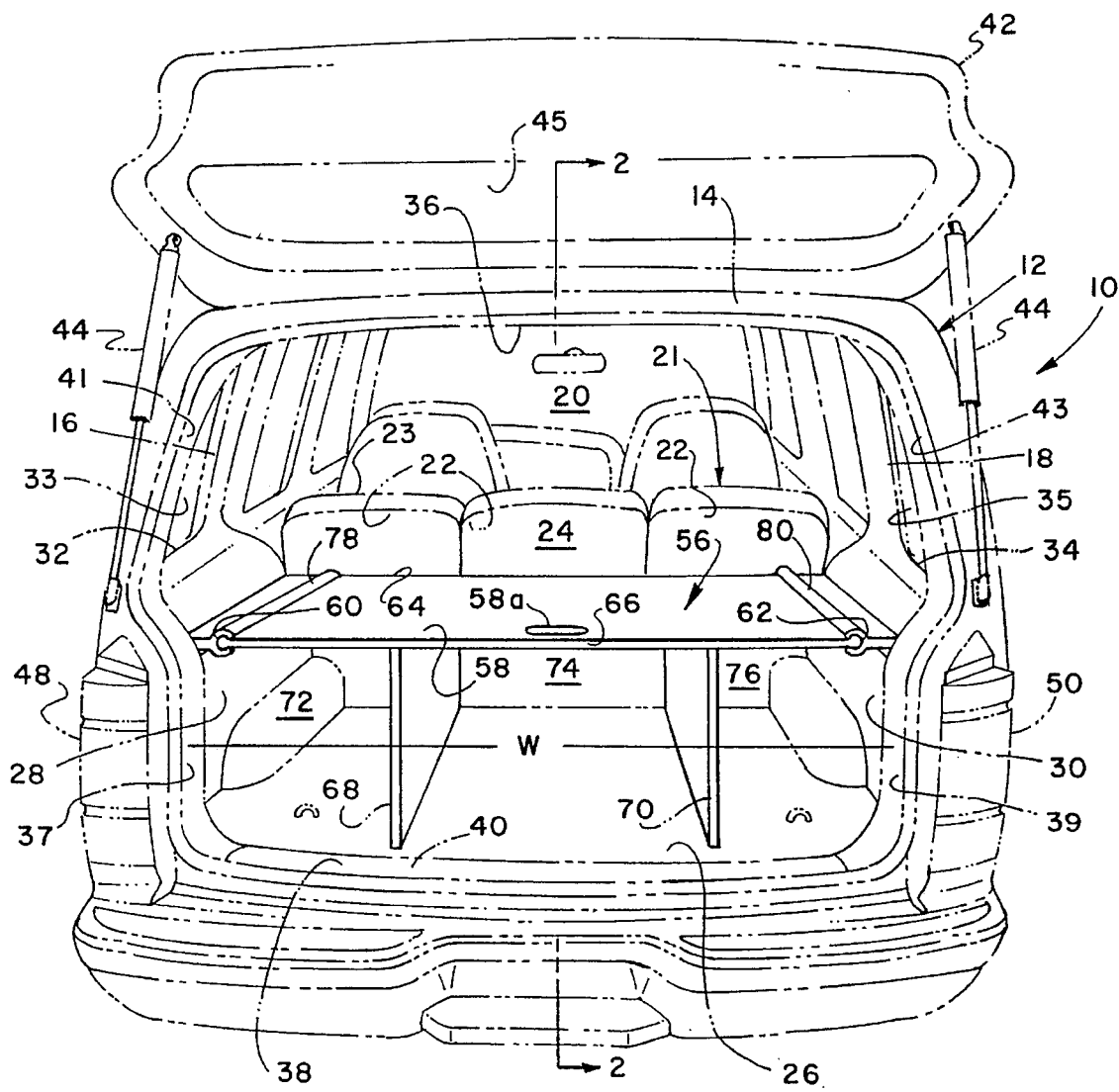
FIG. 1 is a view of the rear access opening of a station wagon, van or sport-utility type automotive vehicle with a liftgate type closure in an open position and showing a preferred embodiment of a security trunk in accordance with the present invention installed in the vehicle cargo compartment.

In the description which follows like elements are marked throughout the specification and drawing with the same reference numerals, respectively. The drawing figures may not all be to scale in the interest of clarity and conciseness.

Referring to FIG. 1, there is illustrated a roadable, automotive motor vehicle, generally designated by the numeral 10, and comprising a station wagon or so-called sport-utility type vehicle. The vehicle 10 is characterized by a body 12, including two or four opposed passenger doors, not shown in detail, a roof 14 and opposed sidewalls 16 and 18 defining a passenger cabin 20. The cabin 20 includes, in the illustrative embodiment, a rear seat 21 including generally upright seatback members 22, which may be split as illustrated, or in one continuous piece. Rearward of the seatbacks 22 is a cargo storage compartment, generally designated by the numeral 24, defined at least in part by the seatbacks 22, a generally horizontal cargo deck or floor 26 and opposed generally vertically extending cargo deck sidewalls 28 and 30, sometimes referred to as trim panels. The sidewalls 28 and 30 extend upwardly generally to the lower edges 32 and 34 of respective rear quarter windows 33 and 35. A vehicle rear access opening 36 is delimited at its lower edge by a sill 38, which may include a scuff plate 40 substantially coplanar with the deck 26. The deck 26 may also be slightly recessed or raised with respect to the sill 38.

In the vehicle 10 shown in FIG. 1, a substantially one piece liftgate 42 is illustrated and is of a type which is hinged at the roof 14 for movement about a horizontal hinge axis between open and closed positions. Suitable telescoping support struts 44 are operable to hold the liftgate 42 in its open position in a conventional manner. The vehicle 10 is further characterized by its rear access opening 36 having a width "W" between lower vertical sidewall portions 37 and 39, which is less than the width of the cargo compartment 24 between the interior sidewalls 28 and 30. This reduced width is necessitated by opposed tail and brake light assemblies 48 and 50 in many vehicles, including the exemplary vehicle 10. Accordingly, in the embodiment shown, the rear access opening 36 has a greater width along upper sidewall portions 41 and 43 and generally above the top edges of the sidewalls 28 and 30 delimited by the lower window edges 32 and 34. The liftgate 42 also includes a fixed or hinged glass portion 45, as illustrated.

The vehicle 10 is exemplary of many types of production station wagon, so-called sport-utility and van type vehicles in that a rear cargo or luggage compartment is defined by the horizontal deck 26, the opposed sidewalls 28 and 30 and a liftgate, tailgate, vertically hinged doors or a combination of doors and liftgate. In any case, the cargo compartment or space 24 is totally exposed for view from the exterior of the vehicle and provides little security for items which may be left on the deck 26.

Figure 2:
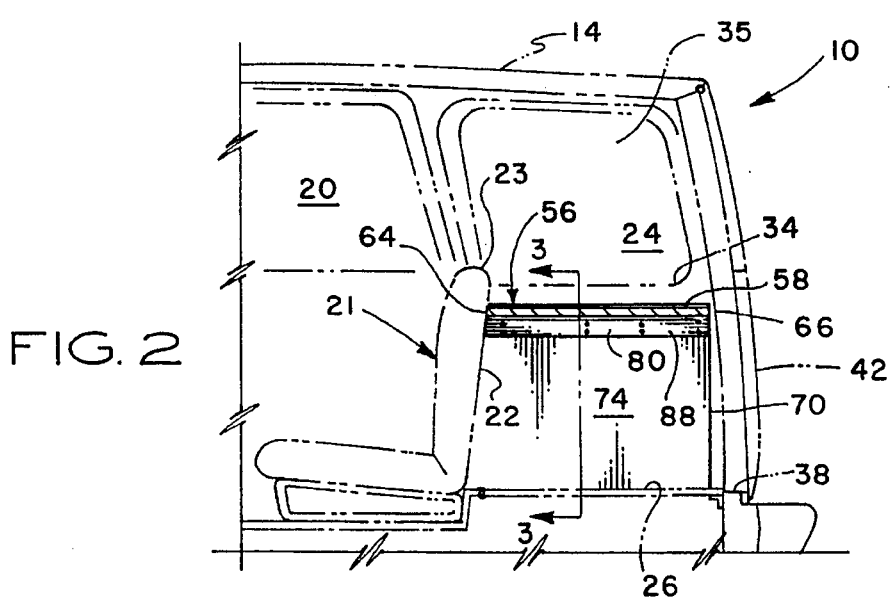
FIG. 2 is a detail section view taken generally along the line 2—2 of FIG. 1.

Referring further to FIGS. 1 and 2, the present invention contemplates a unique security trunk and cargo support means, generally designated by the numeral 56. The security trunk 56 includes a top, generally horizontally disposed, security closure and cargo supporting panel 58, comprising a generally planar member having opposed side edges 60 and 62, a front transverse edge 64, see FIG. 2 also, and a rear transverse edge 66. The panel 58 is generally rectangular in shape. The panel 58 is also adapted to be at least partially supported by one or more spaced apart vertically depending partition members 68 and 70 which extend between the panel 58 and the deck 26. As shown in FIG. 2, the partitions 68 and 70 may be somewhat trapezoidal in shape to be fitted directly behind the inclined seatbacks 22 of the rear seat and extend substantially between the seatbacks and the liftgate 42 in its closed position.

The partitions 68 and 70 are suitably spaced apart to provide three separate cargo compartments 72, 74 and 76 between the sidewalls 28 and 30 and below the top panel 58. The fore and aft dimensions of the partitions 68 and 70 are also preferably coextensive with the fore and aft dimensions of the panel 58, as shown in FIG. 2, whereby the security trunk 56 forms a substantial enclosure for the compartments 72, 74 and 76. Depending on the overall width of the cargo compartment 24, a single vertical partition, for example, may be centered between the trim panels or sidewalls 28 and 30, or more than two partitions may be provided to further compartmentalize the storage space between the sidewalls 28 and 30.

A particularly unique aspect of the security trunk 56 resides in the provision of two opposed support members 78 and 80, FIG. 1, which are engageable with the panel 58 for locating and supporting same within the compartment 24 at a height normally below the top edges 23 of the seatbacks 22 and below the lower window edges 32 and 34 thereby placing the panel 58 in its working position aligned with the reduced width of the access opening 36 as delimited by the sidewalls 37 and 39. Accordingly, the overall width of the panel 58 between the opposed side edges 60 and 62 is required to be slightly less than the width of the opening 36 at the sidewalls 37 and 39. In this regard the support members 78 and 80 are operable to permit the top panel 58 to be inserted in and removed from the compartment 24 through the rear access opening 36 at a position generally co-planar with the panel working position.

Referring further to FIGS. 1 and 2, and primarily FIG. 3, the panel support member 80 is illustrated in further detail by way of example. The support member 80 is preferably somewhat L-shaped having integrally joined elongated flange portions 86 and 88. The flange portion 88 is adapted to depend vertically and is provided with plural fastener receiving openings 90 for receiving suitable fasteners 91 whereby the support member 80 may be secured to the sidewall or trim panel 30 at a predetermined position for supporting side edge 62 of the panel 58. The generally horizontally extending flange portion 86 may be provided with opposed webs 92 and 94, for example, forming a channel 98 with reentrant edges and operable to slidably receive the side edge 62 of the panel 58. A suitable tongue portion 63 enables the panel 58 to be slidably received in the channel 98 but prevented from moving laterally out of the channel. Alternatively, of course, the panel member 58 may be formed with opposed channel defining webs and the flange 86 provided with a suitable enlarged cross section tongue portion.

The support member 78 is of substantially identical configuration and, in fact, may comprise the member 80 turned end for end. Each of the support members 78 and 80 may be suitably positioned on the respective sidewalls 28 and 30 and secured thereto with fasteners 91, as shown by example in FIG. 3. Thanks to the provision of the support members 78 and 80 with their respective, generally horizontally extending flange portions, the security trunk panel 58 may be inserted in and removed from the compartment 24 through the reduced width portion of the access opening 36.

Referring to FIG. 4, an alternate embodiment of a side support member for supporting a trunk panel, such as the panel 58, is illustrated and generally designated by the numeral 104. The side support member 104 has coextensive flange portions 106 and 108 which are hinged to each other at 110 rather than being integrally joined, as illustrated for the embodiments shown in FIGS. 1, 2 and 3. By providing the side support members in the configuration of the member 104, the generally horizontally extending flange portion 106 may be allowed to be folded out of the way when the security trunk panel 58 is removed from the cargo compartment 24 to provide greater uninterrupted width of the compartment for receiving bulky cargo.

Referring also to FIG. 5 there is illustrated a detail of one manner of connecting the partitions 68 and 70, partition 68 shown, to the top panel 58. Each of the partitions 68 and 70 may be provided with opposed integral flange portions 71 along their top horizontal edges for being slidably received in a slot 73 formed by elongated angle members 75 secured to the underside 59 of the panel 58, as shown.

Alternatively, as shown in FIG. 6, the partitions 68 and 70 may be secured to the underside 59 of the panel 58 by suitable hinge means 77. The partitions 68 and 70 may also be secured to the panel 58 by conventional fastener means, not shown. However, by providing the sliding connection shown in FIG. 5 or the hinged connection shown in FIG. 6 between the partitions 68 and 70 and the panel 58 the security trunk 56 may be disassembled and stored on the deck 26 when not in use. Alternatively, if the partitions 68 and 70 are fixed to the panel 58, the security trunk 56 may still be easily inserted in and removed from the cargo compartment 24 or turned upside down with the panel 58 resting on the deck 26 to provide additional space required for items having substantial height to be placed in the compartment 24.

Those skilled in the art will recognize from the foregoing description, and the illustrations of FIGS. 1 through 6, that a unique security trunk or closure is provided for station wagon, sport-utility and van type vehicles which have an open rear cargo or luggage compartment or space which is defined by a rear liftgate, tailgate or door, a generally horizontal load deck and opposed sidewalls or trim panels defining part of the vehicle cabin. The generally horizontally extending top panel 58 forms a closure whereby one or more storage compartments is defined between the panel and the load deck for storing articles so that they cannot be viewed from exterior of the vehicle and may not be accessed except by opening the rear door or gate of the vehicle. Additionally, the security trunk panel 58 may be easily inserted in and removed from the cargo compartment 24 through a rear access opening having at least a partially reduced width with respect to the width of the cargo space between the vehicle interior sidewalls. The unique side support members 78 and 80 may be easily installed in and removed from the vehicle when desired.

The support members 78 and 80 as well as the panel 58 and the partitions 68 and 70 may be formed of suitable material including metals, composite materials or reinforced plastics which are of suitable strength to prevent bending or warping when subjected to normal use. The security trunk 56 also provides an additional, generally horizontal support deck or floor, comprising the panel 58, for easier storage of many types of articles which should not be stacked on top of one another. The panel 58 may be provided with suitable tiedowns, not shown, for a cargo net or other cargo securing means for securing cargo placed thereon. Moreover, the panel 58 may also have, as shown in FIG. 1, a handhold 58a adjacent the rear longitudinal edge 66 to facilitate sliding the panel 58 into and out of its working position.

Figure 7:
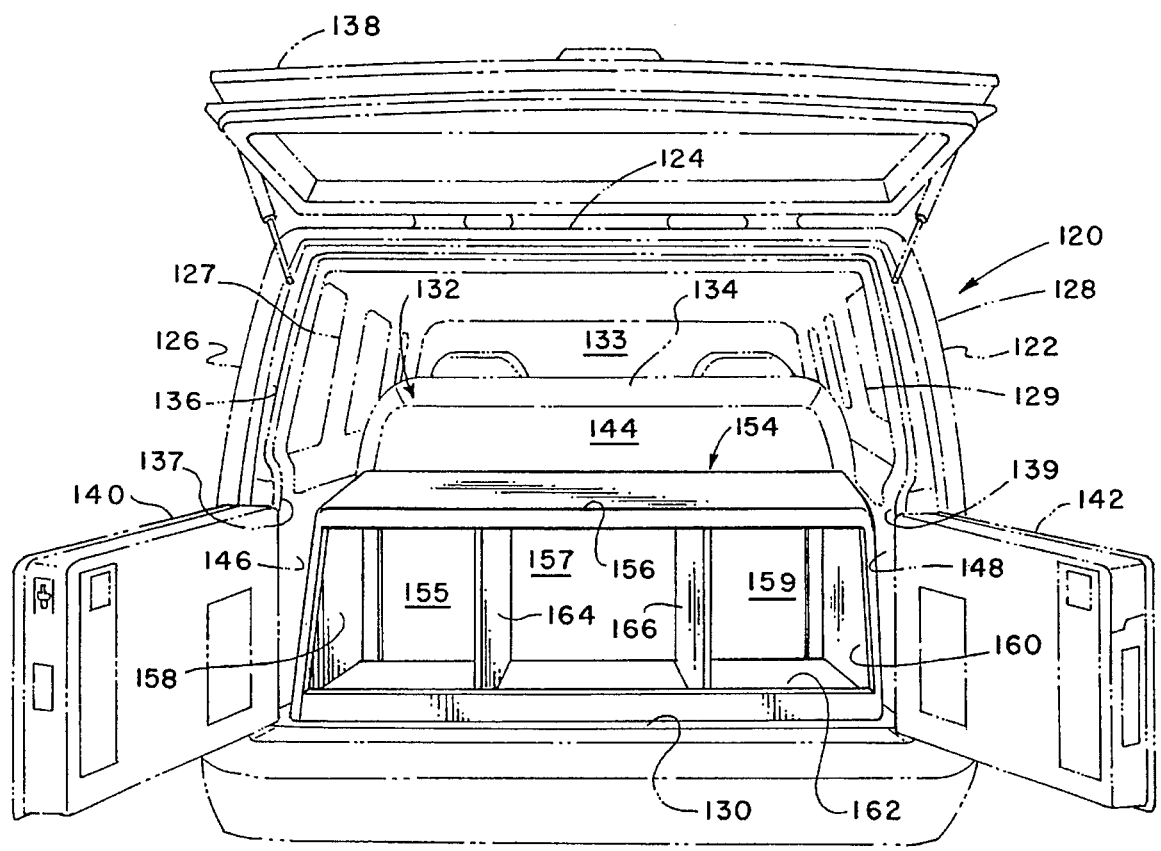
FIG. 7 is a view of the rear access opening of a van-type automotive vehicle showing an alternate embodiment of a security trunk in accordance with the invention disposed in the vehicle cargo compartment.

Referring now to FIG. 7, in particular, there is illustrated a roadable automotive vehicle 120, comprising a conventional passenger van, or so-called minivan, having a body 122 with a top 124, opposed sidewalls 126 and 128, and a rear, generally horizontally extending cargo deck 130. A rear bench seat 132 is disposed within the vehicle cabin 133, defined by the body 122, and includes a generally vertical extending seatback 134. A rear access opening 136 is operable to be closed by a conventional hinged lift glass or gate portion 138 and opposed "dutch" doors 140 and 142, all hinged to the body 122 in a conventional manner. A rear cargo compartment 144 is generally delimited by the seatback 134, interior sidewalls 146 and 148, the deck 130 and the doors 140 and 142 in their closed positions. The sidewalls 138 and 140 may or may not be spaced farther apart than opposed sidewall portions 137 and 139 of the access opening 136.

In any event, a unique portable security trunk 154 is adapted to be supported on the deck 130 in the position shown in FIG. 7. The trunk 154 includes a generally horizontally extending top panel 156, opposed side panels 158 and 160 and a bottom or floor panel 162. Generally vertically extending partitions 164 and 166 are shown disposed between the side panels 158 and 160 and also extending between the top panel 156 and the floor panel 162. A short, transverse rear retaining wall 168 is disposed across the rearward facing side of the trunk 156, extending upward from floor panel 162, to assist in retaining articles in the trunk when the doors 140 and 142 are opened.

Figure 8:
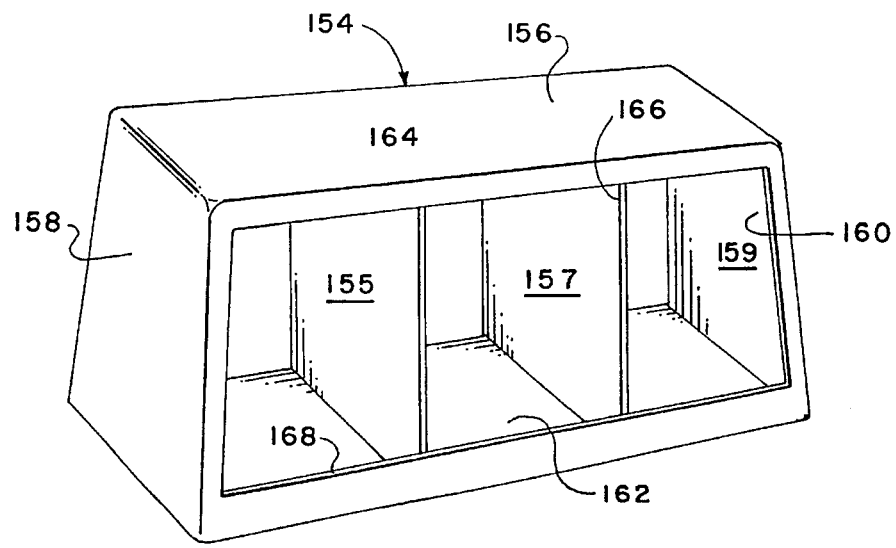
FIG. 8 is a perspective view of the security trunk shown in FIG. 7 removed from the vehicle.

As shown in FIG. 8, the security trunk 154 may be easily removed, in assembly, from the vehicle 120 when desired. The trunk 154 does not require substantial front or back walls extending from the panel 156 to the panel 162, since an enclosure defined by the seatback 134 and the doors 140 and 142, in their closed positions, provide the necessary closure surfaces for the trunk 154. Moreover, the horizontal top panel 156 forms a closure to prevent viewing the contents of the storage spaces or compartments 155, 157 and 159 within the trunk 154 between the top panel and the floor panel 162 when the trunk is in its working position.

The security trunk 154 may also be constructed of suitable lightweight materials of sufficient strength to support articles on top of the panel 156 and on the floor 162. The shape of the front and back side edges of the sidewalls 158 and 160 and the partitions 164 and 166 may be such as to conform to the shape of the compartment 144 so that the security trunk 156 substantially fills the compartment 144 between the floor 130 and the lower edges of the vehicle rear quarter windows 127 and 129 and the top edges of the doors 140 and 142. Accordingly, the security trunk 154 enjoys many of the advantages of the security trunk 56, as will be appreciated by those skilled in the art.

The construction and use of the security trunks 56 and 154 are believed to be within the purview of one of ordinary skill in the art from the foregoing description. Although preferred embodiments of the invention have been described in some detail herein, those skilled in the art will also recognize that various substitutions and modifications may be made to the invention without departing from the scope and spirit of the appended claims.

What is claimed is:

1. A security trunk for a motor vehicle having a cargo compartment defined at least in part by a generally horizontally extending cargo deck, opposed sidewalls and a rear access opening in said vehicle for loading and unloading cargo with respect to said compartment, said security trunk comprising:

opposed support members adapted to be secured to said sidewalls, respectively;

a generally horizontally extending, top panel member coupled to said support members and disposed between a forward end of said cargo compartment and said access opening;

at least one partition member extending between said top panel member and said cargo deck for dividing the cargo compartment into multiple compartment spaces and for at least partially supporting the panel member;

the at least one partition member being coupled to the top panel member on an underside portion thereof; and, the at least one partition member and the top panel member including means forming a slidable connection between the at least one partition member and the top panel member along the underside portion of the top panel member.

2. The security trunk set forth in claim 1 wherein:

the top panel member and the support members have cooperating means permitting sliding movement of the top panel member into and out of the cargo compartment through the access opening.

3. The security trunk set forth in claim 2 wherein:

one of said top panel member and said support members include means defining a channel and the other of said top panel member and said support members include a tongue portion slidably receivable in said channel for retaining said top panel member supported between said support members.

4. The security trunk set forth in claim 3 wherein:

said channel is defined by opposed reentrant edges for retaining said tongue portion.

5. The security trunk set forth in claim 1 wherein:

said top panel member and said partition include cooperating hinge means connecting said partition to said top panel member to permit said partition to be folded between a working position and a position substantially coplanar with said top panel member.

6. The security trunk set forth in claim 1 wherein:

said access opening has a reduced width portion, defined by opposed sidewall portions, which is less than the distance between said sidewalls of said cargo compartment and said support members each include a laterally extending flange portion of sufficient width to provide for supporting said top panel member for slidable movement into and out of said cargo compartment through said reduced width portion of said access opening.

7. A security trunk for disposition in a rear cargo compartment of a motor vehicle, said cargo compartment being defined by a generally horizontally extending cargo deck, opposed sidewalls, an upstanding seatback and a closure for a rear access opening of said vehicle, said rear access opening having a lower portion which is of a width less than the distance between said opposed sidewalls of said cargo compartment, said security trunk comprising:

opposed elongated support members adapted to be secured to said sidewalls, respectively, each of said support members including a generally horizontally extending flange portion;

a generally planar top panel member having a width less than said width of said lower portion of said access opening and a fore and aft length sufficient to extend said top panel member substantially between said seatback and said closure; and means on said support members and on opposed side edges of said panel member for supporting said panel member on and between said support members, said supporting means permitting sliding movement of said panel member into and out of said cargo compartment through said lower portion of said access opening; and, at least one partition member coupled to the top panel member and extending to the deck for at least partially supporting the top panel member in the cargo compartment.

8. The security trunk set forth in claim 7 wherein:

one of said top panel member and said support members include means defining a channel and the other of said top panel member and said support members include a tongue portion slidably receivable in said channel for retaining said top panel member supported between said support members.

9. The security trunk set forth in claim 7 wherein:

said support members each include flange portions cooperable with means for securing said flange portions to said sidewalls of said cargo compartment.

10. A security trunk for a motor vehicle having a cargo compartment defined by a generally horizontally extending cargo deck, opposed sidewalls extending upward from said cargo deck to the bottom edges of opposed rear quarter windows of said vehicle, an upstanding rear seatback and a closure for a rear access opening of said vehicle for access to said compartment, said access opening having a reduced width portion extending generally between said deck and said bottom edges of said quarter windows, said security trunk comprising:

opposed support members, each including a first flange portion operable for securing said support members to said sidewalls, respectively, and generally horizontally extending second flange portions having, respectively, means defining one of a tongue portion and an elongated channel, said support members being configured such that when they are mounted on said sidewalls, respectively, the distance between said second flange portions is less than said reduced width portion of said access opening;

a generally planar top panel member having a width less than said reduced width portion of said access opening and a fore and aft length less than the distance between said seatback and said closure, said top panel member including opposed sides cooperable with said means on said support members for supporting said top panel member between said support members and for permitting said top panel member to be slidable into and out of said cargo compartment through said rear access opening at said reduced width portion thereof; and at least one generally vertically extending partition connected to an underside of said top panel member and extending toward said deck.

* * * * *